April 27, 1948. G. E. VAN VESSEM 2,440,352
AUTOMATIC ELECTRIC MOTOR CONTROL SYSTEM
Filed June 2, 1943
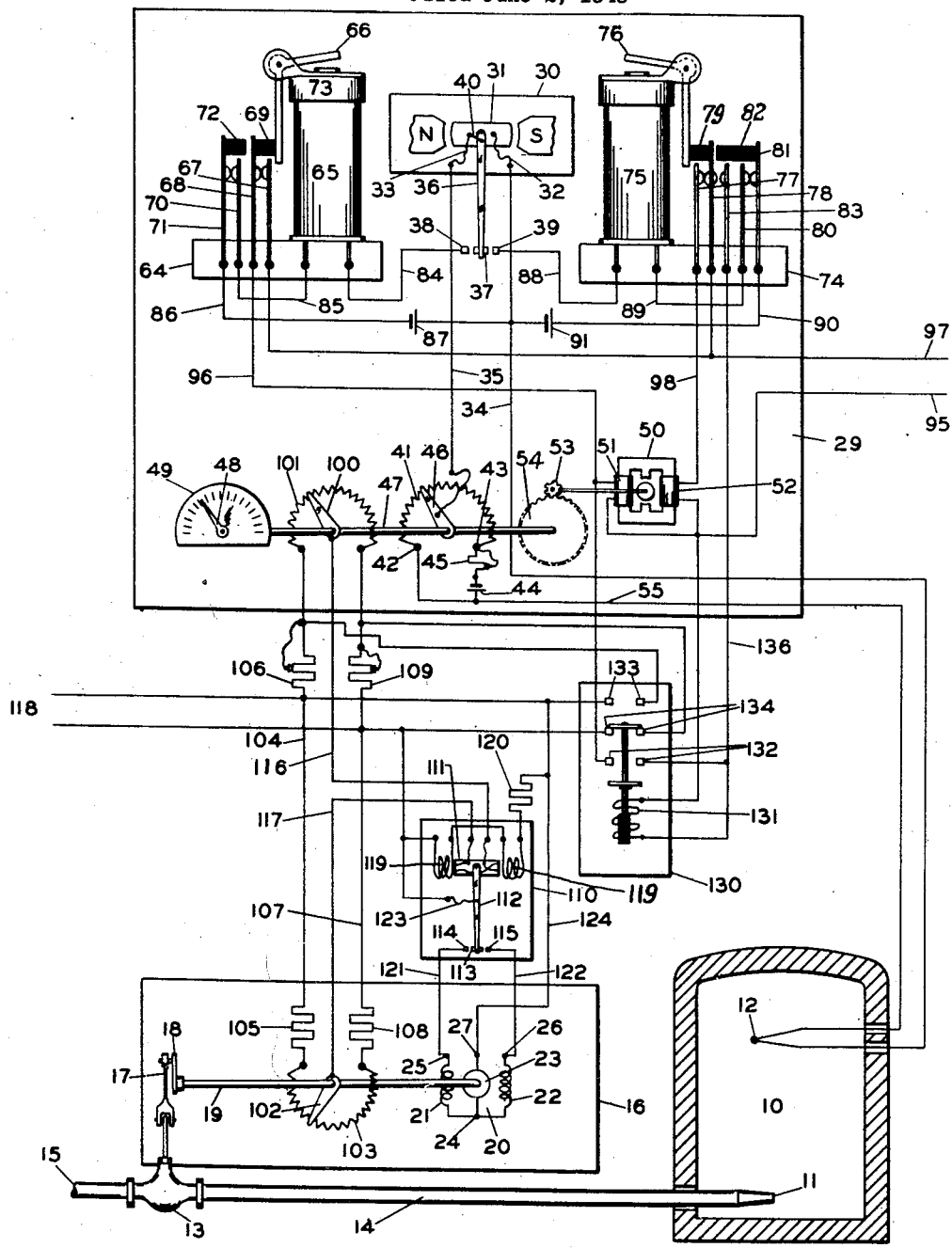
INVENTOR.
GEORGE E. VAN VESSEM
BY
E. C. Sanborn
Attorney Patented Apr. 27, 1948

2,440,352

UNITED STATES PATENT OFFICE 2,440,352

AUTOMATIC ELECTRIC MOTOR CONTROL SYSTEM

George E. Van Vessem, Naugatuck, Conn., assignor to The Bristol Company, Waterbury, Conn., a corporation of Connecticut Application June 2, 1943, Serial No. 489,346

12 Claims. (Cl. 318—28)

This invention relates to control devices, and more especially to an automatic proportioning control, in which a floating control member is caused to assume a position more or less determined by the position of a measuring element quantitatively responsive to a condition subject to the effect of a medium regulated by said member.

In the automatic control of variables such as temperature, it is customary to provide a valve through which may flow a supply of fuel or other temperature affecting agent, and to operate said valve by means of an electric motor whose action is commanded by a relay system subject to the deviation of the position of said valve from a position established by the mechanism of a temperature-sensitive instrument. One common method by which a proportional relationship may be established between the position of the valve and that determined by the instrument is found in the combination of a slide-wire resistance adjustable in response to changes in the position of the valve, and another slide-wire resistance adjustable by action of the measuring instrument. These resistances being connected to form a bridge network with a sensitive detector in the bridge arm and a source of electrical energy suitably connected to the network, there is provided a simple means by which a motor actuated by said detector may be caused to operate the valve to a definite position determined by the setting of the slide-wire associated with the measuring instrument. This is a conventional and well-known form of remote control, and is found in many devices for distant regulation of motors. Probably one of the earliest examples is that disclosed in U. S. Letters Patent No. 599,903 to M. Pfatischer, May 12, 1896. In the disclosure of Pfatischer, the principle is shown in its application to the remote operation of steering gear for ships, the rudder mechanism being mechanically attached to a suitably tapped rheostat, and the manually actuated control element on the bridge of the ship being attached to a similar rheostat, and a detecting relay connected between the two moving contactors, being arranged to control the performance of a steering engine or electric motor.

In the application of the slide-wire principle to the proportional control, for example, of a valve for regulating the temperature of an enclosed space containing materials to be processed, there enters the feature of time lag, which is inseparable from automatic control, and which tends to introduce a certain degree of "overshooting" in the values of temperature attained. Coupled with this characteristic is the feature that a relay sufficiently rugged to effect control of a valve motor is likely to have a degree of sensitivity too low to utilize the full advantage obtainable from the electrical coupling between the controlling and controlled members.

It is an object of this invention to provide means whereby the sensitivity of a bridge coupling between a measuring instrument of the self-balancing type and a controlling valve or the like may be made as high as that of the detector in the measuring system of the self-balancing instrument.

It is a further object to provide a form of "anticipatory" control, in which the features of "thermostatic" regulation and "proportioning" control are combined to approximate closely an ideal "straight-line" characteristic.

It is a further object to provide means of the above nature in which the element of backlash due to lost motion in mechanical parts or to coarseness of tapping in the bridge rheostats may be eliminated from the performance of the mechanism.

The single figure of the drawings is a diagrammatic representation of an electrical temperature control system embodying the principles of the invention, and subject to actuation by a self-balancing pyrometer of the potentiometric type.

Referring now to the drawings:

The numeral 10 designates a furnace, oven, or other enclosed space adapted to be heated by the combustion of fluid fuel admitted thereto through a burner 11, and in which it is desired to maintain a predetermined constant temperature as determined by a thermocouple 12 located within the furnace, the regulation of said temperature being effected by control of the position of a valve 13 connected in a conduit 14 through which said fuel is supplied to the burner 11 from a source 15. The valve 13 is actuated by an operating mechanism 16 comprising a link member 17 connected to a crank element 18 carried by a shaft 19 adapted for rotation through a limited angle by means of a reversible electric motor 20. The motor 20 is provided with opposed (field) windings 21 and 22, and a single (armature) winding 23, and is adapted for rotation in a direction depending upon which of the respective field windings is energized concurrently with the single armature winding. One end of each of the three motor windings is connected to a common conductor 24, the free ends of the field windings 21 and 22 to terminals 25 and 26 respectively, and the free end of the armature winding 23 to a terminal 27.

*Potentiometer circuit and balancing mechanism*

The numeral 29 designates a self-balancing circuit mechanism similar to that fully set forth and disclosed in the Patent to F. B. Bristol, No. 2,320,066, issued May 25, 1943, and having the following structure: A galvanometer 30 of the conventional form includes a coil 31 freely pivoted between poles N and S of a permanent magnet or the equivalent. Electrical connection is made to the coil 31 by means of resilient leads or springs 32 and 33 connected respectively to conductors 34 and 35, forming elements in an electrical network hereinafter to be described, whereby upon passage of current from one to the other of said conductors through said galvanometer coil, the latter will tend to be rotated through a limited angle about its axis in a sense either clockwise or counter-clockwise, according to the direction of the current. Carried by the galvanometer coil is a pointer 36 bearing upon its extremity a contact member 37 adapted to engage either of two stationary contacts 38 and 39, according to the sense of the deflection. The end of the coil 31 which is connected to the spring 33 is also connected to the pointer 36 by means of a conductor 40, whereby current may pass between the conductor 34 and the pointer 36 by flowing through the galvanometer coil 31.

A potentiometer circuit includes a uniform slide-wire 41 of arcuate curvature extended between terminals 42 and 43 and supplied with a steady current from a battery 44, whose output may be regulated by means of an adjustable rheostat 45. Suitably engaging the slide-wire 41 is a movable contact-arm 46 fixed to a shaft 47 coaxial with the center of curvature of the slide wire 41, and insulated therefrom, whereby upon rotation of said shaft through a limited angle, the contact arm 46 may traverse said slide wire through its length, and may assume any position along said slide wire, according to the angular position at which the shaft is brought to rest. An index 48, carried by the shaft 47, and cooperating with a fixed arcuate calibrated scale 49, provides an indication of the position of said contact arm 46 with respect to the slide-wire 41.

Rotation of the shaft 47 for the purpose of shifting the contact arm 46 along the slide-wire 41 is effected by means of a reversible electric motor 50 having two opposed windings 51 and 52, adapted normally to be simultaneously energized and to maintain said motor stationary, and, when individually deenergized to operate said motor in either direction according to which of said windings remains energized. The shaft of the motor 50 carries a pinion 53 meshing with a gear 54 fixed to the shaft 47, whereby said shaft and elements carried thereby will be angularly moved according to which of the two windings of the motor 50 may be energized.

The potentiometer circuit comprising the slide-wire 41, the battery 44, the rheostat 45, and the contact arm 46 is applied to the measurement of the thermoelectromotive force developed by the couple 12, and hence of the temperature within the enclosed space 10. One element of the thermocouple is connected by means of a conductor 55 to the terminal 42 of the slide wire, and the other element to the conductor 34 leading to one side of the galvanometer coil 31. The conductor 35 leading to the other side of the galvanometer is flexibly or slidably connected to the contact arm 46, whereby the potential at any point along said slide-wire due to the flow of current therethrough from the battery 44, may be applied to the conductor 35 according to the deflected position of the contact arm.

According to well known principles upon which the art of potentiometric pyrometry is based, when the intensity and direction of the current in the slide-wire are suitably adjusted, the position of the contact arm 46, and therefore of the index 48, corresponding to a balance of the potentiometer network, as indicated by a zero deflection of the galvanometer pointer 36, is a measure of the temperature to which the thermocouple 12 is exposed. The polarity of the thermocouple 12, as connected to the conductors 34 and 35, is made such that upon an increase of potential developed by said couple due to an increase in the temperature to which it is exposed, the unbalance current due to the excess of said E. M. F. over that derived from the slide wire will cause to pass through the galvanometer coil 31 a current tending to swing said coil in a counter-clockwise sense, and cause the contact 37 carried by the pointer 36 to be brought into electrical engagement with the stationary contact 38. In a similar manner a decrease in temperature at the thermocouple will cause the galvanometer coil to be deflected in an opposite sense, and the contact 37 brought into engagement with the stationary contact 39. The setting of the contact arm 46 with respect to the slide wire 41 is effected by the motor 50 through the medium of a relay combination of the type set forth in said F. B. Bristol patent and, while such combination will be briefly described, no invention thereof is herein claimed.

A relay 64 embodies an actuating magnet coil 65 and an armature 66 subject thereto. Normally engaged contacts 67 and 68 are adapted to be separated by the movement of the armature transmitted through an insulating pad 69 when the coil 65 is energized. Further contacts 70 and 71, also normally engaged, are adapted to be separated by movement of said armature transmitted through an insulating pad 72 when the coil 65 is energized. The coil 65 is fitted with a short circuited lag-plate or shroud 73; and, as fully set forth in said F. B. Bristol patent, said shroud and the physical dimensions and adjustments of the contact-actuating elements are so coordinated as to introduce a desirable time-relationship in the operation of the contacts.

A relay 74, similar in all respects to relay 64, embodies a magnet coil 75 and an armature 76, together with normally closed contacts 77 and 78 actuated by said armature through an insulating pad 79, and further normally closed contacts 80 and 81 actuated through an insulating pad 82. The coil 75 is lagged in a manner similar to the coil 65, and all the elements of the relay 74 are proportioned and adjusted to give a performance substantially identical with that of the relay 64 with respect to sequential actuation of contact elements. In addition to the contact elements thus far set forth as incorporated in the relay 74, the contact 78 is made double acting, and there is provided contact element 83 adapted to be engaged by said contact 78 when the latter is separated from engagement with the contact 77 by action of the armature 76 in response to energization of the relay coil 75. This feature is not disclosed in said F. B. Bristol patent, and its purpose will be hereinafter specifically pointed out.

The galvanometer contact 38 is connected through a conductor 84 to one terminal of the coil 65, and the free terminal of that coil by means of a conductor 85 to the contact 70. The contact 71 is connected by means of a conductor 86 to one terminal of a small battery or other suitable source of unidirectional E. M. F. 87, and the other terminal of said source to the conductor 34. The galvanometer contact 39 is connected through a conductor 88 to one terminal of coil 75, and the free terminal of that coil by means of a conductor 89, contacts 80, 81, and a conductor 90, to one terminal of a D.-C. source 91, and the other terminal of said source to the conductor.

It will be seen that, upon deflection of the galvanometer pointer 36 sufficiently for the contact 37 to engage the contact 38, a circuit will be completed from one side of the source 87 through the normally closed contacts 70—71, the magnet winding 65, the contacts 38 and 37, and the galvanometer coil 31 to the conductor 34, and thence to the other side of said source. Similarly, upon deflection of the pointer to a position of engagement with the contact 39, a circuit will be formed from one side of the source 91 through contacts 80—81, magnet coil 75, contacts 39 and 37, the galvanometer coil 31, and the conductor 34 back to the other side of said source.

The polarities of the several sources of E. M. F. in the network described are so selected that upon deflection of the galvanometer in either direction by current derived from said network flowing in the coil 31, the supplementary current in said coil derived from the corresponding one of the sources 87 or 91 will be in such a direction as to tend to deflect the galvanometer in the same direction with added intensity, thus supplementing the original directive effort, and tending to amplify the pressure exerted between the movable contact 37 and the stationary contact engaged thereby. The arrangement of the mechanism and the connections of the potentiometer network are such that upon energization of the winding 51 alone of the reversible motor 50 the consequent movement of the contact arm 46 along the slide-wire 41 will be toward the terminal 42 and will tend to reduce the potential between the conductors 55 and 35; and when the winding 52 is energized alone, the movement of the arm 46 will be toward the terminal 43 and will tend to increase said potential.

One terminal of each of the windings 51 and 52 of the reversible motor 50 is connected to a common conductor 95 representing one side of an electric power supply. The free terminal of the winding 51 is connected by means of a conductor 96 to the contact 68 in the relay 64, and the cooperating contact 67 to a conductor 97, forming the other side of said supply. The free terminal of the motor winding 52 is connected by means of a conductor 98 to the contact 77, and the coacting contact 78 to the conductor 97. Thus, it will be seen that with the contact pairs 67—68 and 77—78 in their normally closed positions, both windings of the motor 50 will be simultaneously energized, tending to stall the motor, and that with one of these contact pairs opened while the other remains closed, the motor will be energized for rotation in a corresponding direction as hereinbefore stated.

The operation of the device, as thus far set forth, may be briefly stated as follows: If the position of the contact arm 46 with respect to the slide-wire 41 is such that there exists a condition of balance between the potential developed by the couple 12 and that derived from the potentiometer network, the galvanometer will stand in its un-deflected position, with the contact 37 out of engagement with either of the cooperating contacts 38 and 39; the relays 65 and 75 will be de-energized, and their respective contact pairs 67—68 and 77—78 closed, causing both windings of the motor 50 to be energized, and the motor consequently to remain at rest. Upon a deviation of the thermocouple potential from that derived from the slide-wire, the unbalanced condition will cause a current to flow in the galvanometer coil 31 deflecting it in a sense to close a corresponding contact, and to energize whichever one of the relays 64 and 74 will cause the motor 50 to be operated in a direction to move the contact arm 46 to a position on the slide-wire where a condition of balance will be restored. For purposes of discussion it may be assumed that upon an increase in the temperature measured by the thermocouple 12 the contacts of the galvanometer 30 will be actuated in a sense to energize the coil 65 of the relay 64, with a consequent contact action causing the motor 50 to rotate the shaft 47 and parts carried thereby in a clockwise sense as seen in the drawing, and vice versa. This balancing action is characteristic of many forms of null-type instruments and, as it forms no part of the present invention, and, moreover, is fully set forth in the aforementioned F. B. Bristol patent need not here be further elucidated. The function of the current flowing through the galvanometer coil 31 from the sources 87 and 91 through the contact pairs 70—71 and 80—81, in amplifying the pressure of the galvanometer contacts, together with the timing characteristic introduced by the lagging coils or shrouds on the relay windings 65 and 75 is also identical with that shown in said patent and need not here be explained in further detail.

*Bridge circuit and balancing mechanism*

Control of the valve 13 in response to deflections of the shaft 47 carrying the contact arm 46 is effected by mechanism comprising the following elements in combination: Fixed to the shaft 47 and rotatable therewith is a contact arm 100 engaging an arcuate slide-wire 101 whereby said contact arm may engage said slide-wire at any point within its extended length. Fixed to the valve-operating shaft 19 is a contact arm 102 engaging an arcuate slide-wire 103, whereby, said last-named contact arm may engage said last-named slide-wire. One end of the slide-wire 101 is electrically connected to one end of the slide-wire 103 by means of a conductor 104 having in series therewith a resistor 105 adjacent the slide-wire 103, and an adjustable resistor 106 adjacent the slide-wire 101. The remaining ends of the slide-wires are similarly connected by a conductor 107 having in series therewith a resistor 108 adjacent the slide-wire 103, and an adjustable resistor 109 adjacent the slide-wire 101.

A directional relay 110 comprises a detecting coil 111, pivoted to swing through a small angle, and having a pointer-arm 112 carrying a double-sided contact 113, adapted to engage alternatively either of two stationary contacts 114 and 115. The contact arms 100 and 102 are connected by conductors 116 and 117 respectively to the terminals of the detecting coil 111, and the conductors 104 and 107 to a source of electrical energy 118, whereby the network comprising the slide-wires 100 and 102 and the resistors 105, 106, 108, and 109 forms a bridge circuit which, if unbalanced, will cause current derived from the source 118 to flow through the coil 111 of the relay 110. If the current derived from the source 118 is unidirectional in its nature, the relay 110 may be provided with a permanent magnet field, comprising a substantial equivalent of the contact-making galvanometer 30. As, however, it may be desirable to have said bridge circuit energized with alternating current, the relay 110 is preferably of a form which will detect unbalance in an A.-C. bridge network, and is here shown as of the conventional wattmeter or electrodynamometer type. Juxtaposed to the movable coil 111, is a pair of stationary coils 119, electrically interconnected, and so positioned that the magnetic field produced by an electric current flowing therein will be reacted upon by current flowing in the coil 111 to produce a deflection thereof, the sense of said deflection being dependent upon the relative instantaneous polarities of currents flowing respectively in said movable and stationary coils. The coils 119 are connected in series with a suitable current-limiting resistor 120 across the source 118, whereby said coil will be energized with current of the same nature as that flowing in the bridge circuit. It will thus be apparent that an unbalanced condition of the bridge circuit, as may be established by certain relative positions of the contact arms 100 and 102 with respect to their associated slide-wires, will result in a deflection of the coil 111, and that electrical engagement of the movable contact 113 will be effected with stationary contact 114 or 115, according to the sense of the unbalance.

The stationary contact 114 of the relay 110 is connected by means of a conductor 121 to the terminal 25 of the motor 20, and the contact 115 of said relay by means of a conductor 122 to the terminal 26 of said motor. The movable contact 113 is connected by means of a flexible lead 123 to one side, and the terminal 27 of the motor 20 by means of a conductor 124 to the other side, of the source 118. It will be seen that the combination of the motor 20 and the relay 110 provides means whereby the arm 102 may be moved in response to unbalance conditions of the bridge network, so that by suitably proportioning the several resistance units in the network, and selecting polarities, there is provided a follow-up system, whereby a movement of the contact arm 100 due to the potentiometer-circuit-balancing action of the motor 50 will cause a corresponding positioning action of the arm 102, and consequently of the valve 13, to be effected by the motor 20. The selection of polarities is made such that, upon a movement of the contact-arm 100 toward the right, as seen in the drawing, in response to an increase in the measured temperature, the contact arm 102 will also be moved toward the right, and the valve 13 operated in a sense to effect closing thereof. Thus, with the resistors 105, 106, 108, and 109 included in circuit with the branches of the slide-wires 101 and 103, as divided by the contact arms 100, and 102, the valve 13 will have a definite position corresponding to each selected position of the shaft 47 and elements carried thereby. It will further be obvious that, while the motor 20 has been shown as operated from the same source of supply as the bridge network, there exists no need for interconnection of these circuits; and, if found expedient, the motor and the bridge may be effectively energized from independent sources.

*Anticipating relay*

A relay 130 having an actuating coil 131 is provided with two sets of normally open contacts 132 and 133, and one set of normally closed contacts 134. One side of the winding 131 is connected to one side of the contacts 132, and by a conductor 136 to the auxiliary contact 83 of the relay 74. The other side of the winding 131 is connected to the conductor 95. The free side of the contacts 132 is connected to the conductor 96, and thereby to the contact 68 in the relay 64. The contacts 133 are connected to the two ends of the resistor 106, and the contacts 134 to the two ends of the resistor 109, whereby either of said resistors will be short-circuited by the closure of the associated contacts, and one or other of said resistors will at all times be closed, depending upon whether the winding 131 of the relay 130 is in an energized or a de-energized condition.

The operation of the auxiliary relay 130 and associated connections is as follows: It has already been pointed out that, with resistors 106 and 109 both included in the bridge network of which they form a part, the valve 13 will tend to assume positions corresponding to selected positions of the shaft 47, so that for each value of temperature as measured by the thermocouple 12, there will be a definite position of said valve. It will also be seen that, with the contacts 134 of the relay 130 closed, as shown in the drawing, corresponding to a de-energized condition of said relay, the resistor 109 will be short-circuited, thus distributing any balance that may have been established in the bridge network, and requiring that, without any change in the position of the contact-arm 100, the contact-arm 102 shall assume another than its original balance position with respect to the arm 100 in order to restore the balance in the network. It will further be apparent that the short circuiting of the resistor 109 will disturb the proportionality of the bridge network in such a sense that restoration of the balance will require movement of the arm 102 toward the right, as shown in the drawing, or in a direction corresponding to a closing action of the valve 13. In a similar manner, closing of the contacts 133, corresponding to an energized condition of the relay 130, will short-circuit the resistor 106, unbalancing the bridge network, and for restoration of the balance, requiring that the arm 102 be moved toward the left, as seen in the drawing, and the valve 13 opened to a proportionate extent.

Assuming that the relay 130 has been resting in its de-energized condition, with contacts 132 and 133 open and contacts 134 closed, and that the temperature as measured by the thermocouple 12 should fall, action of the galvanometer 30 will close the contacts 37—39, and energize the winding 75 of the relay 74, establishing a contact condition tending to deflect the pointer 48 to the left on the scale 49, and also to shift the contact arm 100 in a sense to bring about through normal unbalance of the bridge network a corresponding opening action of the valve 13. At the same time, the action of the armature 76 of the relay 74 will cause the contacts 78—83 to be brought into engagement, providing a circuit, whereby current from the conductor 97 may pass through said last-named contacts and the conductor 136 to the winding 131 of the relay 130 and thence to the conductor 95, completing a circuit to energize said last-named relay, and close both the contacts 132 and 133. The closing of the contacts 133, as hereinbefore pointed out, will result in an immediate unbalance of the bridge network in which the relay 110 is included, causing the motor 20 to be energized in a sense to open the valve 13 in anticipation of the control influence subsequently to be derived from the movement of the contact-arm 100 in the normal course of balancing the potentiometer circuit. Closing of the contacts 132 provides a path from the conductor 136 to the conductor 96, and through the contacts 67—68 of the relay 64 to the conductor 97, so that once the relay 130 is energized it will remain locked in its energized position by virtue of current flowing through said path until the conductor 96 is disconnected from the conductor 97 by opening of the contacts 67—68. Thus, the "bias"applied to the valve 13 will be maintained so long as the relay 130 remains energized, which will be until the first succeeding impulse from the galvanometer 30 indicating an increasing of the measured temperature. This impulse, closing the contacts 37—38, and energizing the winding 65 of the relay 64, will cause the contacts 67—68 to be separated, which action, besides affecting the performance of the motor 50 as hereinbefore set forth, will cause the winding 131 of the relay 130 to be de-energized, opening the contacts 132 and 133, and closing the contacts 134, which will immediately "bias" the valve 13 in a closing sense and in anticipation of an influence subsequently to be derived from movement of the arm 100 along the slide-wire 101.

For purposes of simplicity in following the actions of the various elements in the mechanism under conditions of rising or falling temperature, reference may be had to the following table, in which several elements of the mechanism are identified in the middle column, and their respectiev states corresponding to high, and to low, temperature are indicated in the left-hand and right-hand columns respectively:

| Temperature High | Element | Temperature Low |
|---|---|---|
| clockwise | Galv. Coil 31 | counter-clockwise |
| closed | contacts 37-38 | opened |
| opened | contacts 37-39 | closed |
| energized | relay coil 65 | de-energized |
| de-energized | relay coil 75 | energized |
| opened | contacts 67-68 | closed |
| closed | contacts 77-78 | opened |
| opened | contacts 70-71 | closed |
| closed | contacts 80-81 | opened |
| opened | contacts 78-83 | closed |
| de-energized | winding 51 | energized |
| energized | winding 52 | de-energized |
| clockwise | shaft 47 | counter-clockwise |
| closed | contacts 113-114 | opened |
| opened | contacts 113-115 | closed |
| energized | winding 21 | de-energized |
| de-energized | winding 22 | energized |
| counter-clockwise | shaft 19 | clockwise |
| closing | valve 13 (normal) | opening |
| de-energized | relay coil 131 | energized |
| opened | contacts 133 | closed |
| closed | contacts 134 | opened |
| in circuit | resistor 106 | shorted |
| shorted | resistor 109 | in circuit |
| closing | valve 13 (anticipatory) | opening |

There has thus been provided means whereby there are combined the advantageous features of the so-called "thermostatic" control, in which a change of temperature in a given direction results in a substantially immediate response of a valve controlling a temperature-affecting agent, and the "floating" control, wherein said valve tends to be positioned to a degree of opening corresponding to the actual value of the measured temperature. As is well-known to those versed in the art of regulation, the closest possible automatic approach to the ideal control is found in a properly proportioned combination of these two forms of operation. If the resistance values of the resistors 106 and 109 are manually reduced to zero the anticipating effect of the relay 130 will be nullified; while if these values are abnormally increased a condition of instability will be introduced. These resistors may be readily adjusted manually to optimum values governed by particular operating conditions whereby there will result an intermediate condition in which inherent backlash in the basic control system will be neutralized without at the same time introducing an unstable condition, whereby a substantially "straight-line" control will be effected.

The terms and expressions which I have employed are used as terms of description and not of limitation, and I have no intention, in the use use of such terms and expressions, of excluding any equivalents of the features shown and described or portions thereof, but recognize that various modifications are possible within the scope of the invention claimed.

I claim:

1. In a system for automatically regulating a condition, a motor adapted to actuate a valve for controlling a condition-affecting agent, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition, means operatively coupling said measuring instrument and said motor and adapted to cause said motor to move said valve toward positions corresponding to those assumed by said member of said instrument, and further means directly and substantially instantaneously responsive to said sensitive means independently of the position of said member for modifying the coupling between said instrument and motor and in a sense to anticipate the influence normally transmitted through said coupling means.

2. In a system for automatically regulating a condition, a motor adapted to actuate a valve for controlling a condition-affecting agent, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition, means operatively coupling said measuring instrument and said motor and including a bridge network, resistance means actuated by said instrument to affect the balance of said network, other resistance means actuated by said valve motor to affect the balance of said network, instrumentalities in said network and sensitive to unbalance conditions in the same and adapted to cause said motor to actuate said other resistance means in a sense to restore electrical balance in said network, and further resistance means in said network and means responsive to said sensitive means independently of the position of said member for modifying said last-named resistance means to affect the electrical balance in the same sense as the effect due to said first resistance means as actuated by said instrument in response to said sensitive means.

3. In a system for automatically regulating a condition, a motor adapted to actuate a valve for controlling a condition-affecting agent, means sensitive to changes in said condition, a measuring instrument having a member adapted to assume different positions representative of the magnitudes of said condition and in response to the influence of said sensitive means, a bridge network comprising a first resistance element adapted to be varied to affect the balance of said network in accordance with the position of said member and a second resistance element adapted to be varied to affect the balance of said network by said valve-actuating motor, relay means in said network adapted to respond to unbalance conditions in the same to command the operation of said motor, whereby said valve will normally be positioned in accordance with the position assumed by said member, further resistance elements associated with said network, and contact means adapted to cause said further elements to be included into or excluded from said network, in response and definite correspondence to actions of said sensitive means, to affect the balance conditions of said network in the same sense as said balance conditions will be affected by said first resistance element, and thereby to cause said motor to tend to position said valve in anticipation of the influence of variation of said first resistance element.

4. In a system for automatically regulating a condition, a motor adapted to actuate a valve for controlling a condition-affecting agent, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition, a bridge network comprising a first resistance element adapted to be varied to affect the balance of said network in accordance with the position of said member and a second resistance element adapted to be varied to affect the balance of said network by said valve-actuating motor, relay means in said network adapted to respond to unbalance conditions in the same to command the operation of said motor, whereby said valve will normally be positioned in accordance with the position assumed by said member, means adapted to bias said network on either side of a balance condition whereby its balance may be affected without varying either said first or said second resistance element, means subject to said sensitive means independently of the position of said member to actuate said biasing means in one sense upon a change in said condition in a given direction, and to actuate said biasing means in a reverse sense upon a change in an opposite direction.

5. In a system for automatically regulating a condition, a motor adapted to actuate a valve for controlling a condition-affecting agent, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition, means operatively coupling said measuring instrument and said motor and adapted to cause said motor to move said valve toward positions corresponding to those assumed by said member of said instrument, and further means directly and substantially instantaneously responsive to said sensitive means on a first response only of said sensitive means to a change in said condition in a given direction subsequent to a change in the opposite direction, for modifying the coupling between said instrument and motor and in a sense to anticipate the influence normally transmitted through said coupling means.

6. In a system for automatically regulating a condition, a motor adapted to actuate a valve for controlling a condition-affecting agent, means sensitive to changes in said condition, a measuring instrument having a member adapted to assume different positions representative of the magnitudes of said condition and in response to the influence of said sensitive means, a bridge network comprising a first resistance element adapted to be varied to affect the balance of said network in accordance with the position of said member and a second resistance element adapted to be varied to affect the balance of said network by said valve-actuating motor, relay means in said network adapted to respond to unbalance conditions in the same to command the operation of said motor, whereby said valve will normally be positioned in accordance with the position assumed by said member, further resistance elements associated with said network, a relay, contacts on said relay, a locking circuit for said relay adapted to be completed by said contacts and to be opened by said sensitive means, means actuated by said sensitive means for energizing said relay, circuit controlling means actuated by said relay and adapted to cause said further resistance elements to be included in or excluded from said network to affect the balance conditions in the same sense as said balance conditions will be affected by said first resistance element, and thereby to cause said motor to tend to position said valve in anticipation of the influence of variation of said first resistance element.

7. In a system for automatically regulating a condition, a motor adapted to actuate a valve for controlling a condition-affecting agent, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition, a bridge network comprising a first resistance element adapted to be varied to affect the balance of said network in accordance with the position of said member and a second resistance element adapted to be varied to affect the balance of said network by said valve-actuating motor, relay means in said network adapted to respond to unbalance conditions in the same to command the operation of said motor, whereby said valve will normally be positioned in accordance with the position assumed by said member, means adapted to bias said network on either side of a balance condition whereby its balance may be affected without varying either said first or said second resistance element, means subject to said sensitive means to actuate said biasing means in one sense upon a first response only of said sensitive means to a change of said condition in a given direction, and to actuate said biasing means in an opposite sense upon the first subsequent response of said sensitive means to a change of said condition in an opposite direction.

8. In a system for automatically regulating a condition, a motor adapted to actuate a valve for controlling a condition-affecting agent, electric means sensitive to change in said condition, a galvanometer responsive to said electric means, a potentiometer network including said galvanometer and said sensitive means, mechanical means adapted to balance said potentiometer network, relay means actuated by said galvanometer for controlling said balancing means, a bridge network, a first variable resistance element in said bridge network and adapted to be varied by said potentiometer balancing means whereby the balance of said bridge may be affected, a second variable resistance element in said bridge network and adapted to be varied by said valve motor whereby the balance of said bridge may be affected, relay means in said bridge network adapted to respond to unbalance conditions in the same to command the operation of said motor, whereby said valve will normally be positioned in accordance with the position assumed by said potentiometer-balancing means, further resistance elements associated with said network, and contact means adapted to cooperate individually with said further elements to cause the same to be included in or excluded from said bridge network, electrical means for actuating said contact means and a circuit for said electrical means, circuit-affecting means included in said galvanometer-actuated relay means for selectively controlling said contact means in accordance with the sense of change in said condition as detected by said galvanometer to modify the balance of said bridge network by the inclusion or exclusion of said last-named resistance elements, and thereby to cause said motor to tend to position said valve in anticipation of the influence of variation of said first resistance element.

9. In a system for automaticaly affecting a condition, a motor adapted to actuate an element for controlling said condition, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition,, means operatively coupling said measuring instrument and said motor for causing said motor to move said element in accordance with the operation of said member, and further means directly and substantially instantaneously responsive to said sensitive means independently of the position of said member for causing said motor to impart to said element a movement anticipatory of the influence normally transmitted through said coupling means.

10. In a system for automatically regulating a condition, a motor adapted to actuate an element for controlling a condition-affecting agent, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition, means operatively coupling said measuring instrument and said motor and adapted to cause said motor to move said element toward positions corresponding to those assumed by said member of said instrument, and further means directly and substantially instantaneously responsive to said sensitive means independently of the position of said member for modifying the coupling between said instrument and motor and in a sense to anticipate the influence normally transmitted through said coupling means.

11. In a system for automatically regulating a condition, a motor adapted to actuate an element for controlling a condition-affecting agent, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition, means operatively coupling said measuring instrument and said motor and including a bridge network, resistance means actuated by said instrument to affect the balance of said network, other resistance means actuated by said motor to affect the balance of said network, instrumentalities in said network and sensitive to unbalance conditions in the same and adapted to cause said motor to actuate said other resistance means in a sense to restore electrical balance in said network, and further resistance means in said network and means responsive to said sensitive means independently of the position of said member for modifying said last-named resistance means to affect the electrical balance in the same sense as the effect due to said first resistance means as actuated by said instrument in response to said sensitive means.

12. In a system for automatically regulating a condition, a motor adapted to actuate an element for controlling a condition-affecting agent, means sensitive to changes in said condition, a measuring instrument comprising electrical means adapted to be unbalanced by changes in said condition and a member adapted under the influence of said sensitive means to assume different positions to restore a balanced condition in said electrical means, said positions being representative of the magnitudes of said condition, means operatively coupling said measuring instrument and said motor and adapted to cause said motor to move said element toward positions corresponding to those assumed by said member of said instrument, and further means directly and substantially instantaneously responsive to said sensitive means on a first response only of said sensitive means to a change in said condition in a given direction subsequent to a change in the opposite direction, for modifying the coupling between said instrument and motor and in a sense to anticipate the influence normally transmitted through said coupling means.

GEORGE E. VAN VESSEM.

REFERENCES CITED

The following references are of record in the file of this patent:

UNITED STATES PATENTS

| Number | Name | Date |
| --- | --- | --- |
| 2,079,497 | Wilhjelm | May 4, 1937 |
| 2,119,061 | Stein et al. | May 31, 1938 |
| 2,174,910 | Spangenberg | Oct. 3, 1939 |
| 2,246,686 | Jones | June 24, 1941 |
| 2,300,537 | Davis | Nov. 2, 1942 |
| 2,311,118 | Matthews et al. | Feb. 16, 1943 |
| 2,312,711 | Harrison | Mar. 2, 1943 |
| 2,320,066 | Bristol | May 25, 1943 |
| 2,390,793 | Jones | Dec. 11, 1945 |